(12) United States Patent
Ichinose (10) Patent No.: US 7,646,515 B2
(45) Date of Patent: Jan. 12, 2010

(54) IMAGE READING APPARATUS AND IMAGE READING SYSTEM

(75) Inventor: Hayato Ichinose, Minamikoma-gun (JP)

(73) Assignee: Nisca Corporation, Minamikoma-Gun, Yamanashi (JP)

( * ) Notice: Subject to any disclaimer, the term of this patent is extended or adjusted under 35 U.S.C. 154(b) by 0 days.

(21) Appl. No.: 12/232,559

(22) Filed: Sep. 19, 2008

(65) Prior Publication Data
US 2009/0086283 A1 Apr. 2, 2009

(30) Foreign Application Priority Data
Sep. 28, 2007 (JP) ............... 2007-254815

(51) Int. Cl.
*H04N 1/04* (2006.01)
*H04N 1/00* (2006.01)
*G03G 15/04* (2006.01)

(52) U.S. Cl. ............... 358/496; 358/498; 358/471; 399/379; 399/367; 399/123

(58) Field of Classification Search ............... 358/496, 358/498, 401, 296, 501, 471; 399/379, 380, 399/367, 361, 343, 123
See application file for complete search history.

(56) References Cited

U.S. PATENT DOCUMENTS 6,862,115 B1 * 3/2005 Kondo ............... 358/474

2007/0201113 A1 * 8/2007 Nishikawa et al. ............ 358/506

FOREIGN PATENT DOCUMENTS

| JP | H05-333449 | | 12/1993 |
| JP | 2001223832 A | * | 8/2001 |
| JP | 2002-165059 | | 6/2002 |
| JP | 2002-354191 | | 6/2002 |

* cited by examiner

*Primary Examiner*—Cheukfan Lee
(74) *Attorney, Agent, or Firm*—Manabu Kanesaka (57) ABSTRACT

An image reading apparatus includes a housing; image reading device for reading an image from a document being conveyed, the image reading device being located in the housing; a platen located in the housing and including a transparent member for reading the image of the document; and a scoop-up device situated at a downstream of the platen in parallel therewith to scoop up the document. The scoop-up device includes a dust collecting space for collecting dust entering the apparatus through a gap between the platen and the scoop-up member, the dust collecting space having a plate member dividing the dust collecting space into an upper dust collecting space and a lower dust collecting space; and a platen joint portion forming a part of the dust collecting space and positioned below the platen. A top surface of the platen joint portion detachably contacts a bottom surface of the platen.

7 Claims, 6 Drawing Sheets

IMAGE READING APPARATUS AND IMAGE READING SYSTEM

BACKGROUND OF THE INVENTION AND RELATED ART STATEMENT

The present invention relates to an image reading apparatus such as a copier, a facsimile machine, or a scanner which optically reads an image from a document, and in particular, to a technique for preventing dust such as paper dust from entering the interior of the apparatus through the periphery of platen glass.

In general, an image reading apparatus of this kind is commonly used in various optical machines such as an apparatus optically reading an image from a document sheet on a platen using a photoelectric conversion element. As the platen, a document fixing platen and a document traveling platen are known; a document sheet is set to remain stationary on the document fixing platen, and the document traveling platen transfers the document sheet at a predetermined speed.

For example, Japanese Patent Laid-Open No. 2002-354191 discloses an apparatus including both a document traveling platen above which a document feeding device (unit) is located to automatically feed document sheets and a document fixing platen provided with a platen cover that covers the document.

In such an apparatus, the document traveling platen requires a guide mechanism that scoops up the document sheet moving at the predetermined speed, from the platen. In general, the guide mechanism is configured such that a member surface of the guide mechanism to which the platen is fixed is composed of a guide surface so as to scoop up the document sheet from the platen (this member is hereinafter referred to as a "guide member"). The guide member forms a step that is slightly lower than the platen surface so as to avoid unwanted force to the scooped-up document sheet, for example, impact or ruck for the document sheet. Thus, as is known, dust such as paper dust may disadvantageously enter the interior through an abutting portion between the guide member and an end surface of the platen and adhere to an image reading mechanism (a mirror, a lens, or the like).

To solve this problem, for example, Japanese Patent Laid-Open No. 2002-354191 proposes a sealing mechanism in which a thin sheet such as a polyethylene film is laid so that the dust is collected on a surface of the film in order to prevent paper dust from entering the apparatus through the gap between a side end surface of the platen and the guide member.

Japanese Patent Laid-Open No. 2002-165059 proposes a sealing structure in which the guide member has a dust collecting space in which dust is collected and in which the area between the space and a bottom surface (an inner side surface of the apparatus) of the platen is filled with a film member.

Japanese Patent No. 3016306 proposes a sealing structure in which a shield member is interposed between the side end surface of the platen and the guide member.

The unwanted entry of dust into the apparatus through the document traveling platen is caused by splash of paper dust or toner from a document traveling on the platen and a failure to rigidly bond the platen and guide member together because of the need for occasional replacement of the platen due to damage to the platen surface, for example, a flaw on the platen surface, caused by the traveling document.

As described above, when the platen on which the document sheet travels is integrally coupled to the guide member scooping up the document sheet from the platen, a step needs to be formed between the platen and the guide member so as to allow the document sheet to be smoothly conveyed. Furthermore, for maintenance, the platen needs to be removed to open the interior of the apparatus. Thus, dust such as paper dust may disadvantageously accumulate in the area between the platen and the guide member and further enter the interior of the apparatus.

To prevent the possible entry of dust, the shield structures proposed in the above-described patent documents have been adopted. For example, in the apparatus disclosed in Japanese Patent Laid-Open No. 2002-354191, the elastic film material is laid between the bottom surface of the platen and the guide member, which supports the bottom surface, to prevent dust from entering the interior. Similarly, in the apparatus disclosed in Japanese Patent No. 3016306, the shield member such as a sponge is placed between the end surface of the platen and the guide member to prevent dust from entering the interior.

The structure in which the shield member is interposed between the platen and the guide member allows dust such as paper dust to be collected in the step portion between the platen and the guide member. The dust collected at an edge of the platen may disadvantageously adhere to the platen surface when the platen glass becomes hot. That is, the temperature of the platen glass is increased by heat from an exposure lamp, and the heat further causes the dust such as toner ink to be deposited on the platen surface. Furthermore, in an apparatus configuration in which a document conveying unit located above the platen is opened and closed, a heavy mechanical impact acts on the platen every time the document conveying unit is opened or closed. Vibration and wind pressure caused by the opening or closing of the document conveying unit may create a gap in the shield member. As a result, dust collected on the step portion may enter the interior of the apparatus through the gap.

Thus, a structure has been proposed in which a dust collecting space is formed in the guide member to collect the dust in the space as disclosed in Japanese Patent Laid-Open No. 2002-165059. However, the structure proposed in Japanese Patent Laid-Open No. 2002-165059 simply has the space (dust collecting chamber) in which dust entering through the end surface of the platen is collected. Thus, the dust collected in the space may disadvantageously enter the interior of the apparatus. That is, in the structure of Japanese Patent Laid-Open No. 2002-165059, the dust collecting chamber is blocked with the film member (sealing member) provided on the platen. Thus, when vibration or wind pressure acts on the platen as described above, dust may disadvantageously leak into the interior of the apparatus through the sealing portion.

The present inventor focuses on the fact that the operation of opening or closing the document conveying unit applies shocking vibration and wind pressure to the platen glass and cause dust such as paper dust to enter the interior of the apparatus. The present inventor has thus conceived the idea that by forming a dust collecting space (dust collecting pocket) in the guide member and regulating the motion of dust collected in the pocket when the dust falls under the effect of vibration or wind pressure, the disadvantageous possible entry of dust into the interior of the apparatus can be prevented.

A main object of the present invention is to provide an image reading apparatus that prevents dust such as paper dust from entering the interior of the apparatus when the platen is coupled to the guide member, which scoops up the traveling document from the platen.

Further objects and advantages of the invention will be apparent from the following description of the invention.

SUMMARY OF THE INVENTION

To accomplish this object, the present invention provides an image reading apparatus including a guide member scooping up paper dust or the like from a platen and provided with a dust collecting space (pocket), and a plate-like member provided on the platen and projecting into interior of the pocket to divide the dust collecting space into an upper dust collecting space and a lower dust collecting space. The present invention thus maximizes the distance over which dust entering the apparatus through a gap between the plate and the guide member moves before reaching an entry pathway (inlet) to the interior of the apparatus which is located on a bottom side of the platen. The present invention thus reduces the likelihood that the dust enters the interior of the image reading apparatus.

The image reading apparatus comprises a housing, image reading means for reading an image from a document being conveyed, the image reading means being held in the housing, a platen located in a part of the housing and comprising a transparent member to allow the image to be read from the document being conveyed, and a scoop-up member installed at a downstream of and next to the platen to scoop up the document. The scoop-up member includes a dust collecting space in which dust entering the apparatus through a gap between the platen and the scoop-up member, and a platen joint portion forming a part of the dust collecting surface and positioned below the platen. The platen joint portion contacts a bottom surface of the platen so as to be separable from the bottom surface. The dust collecting space includes a plate-like member dividing the dust collecting space into an upper dust collecting space and a lower dust collecting space.

The plate-like member includes a first end fixed to a bottom surface of the platen and a second end projecting into the dust collecting space.

The bottom surface of the platen and the platen joint portion contact each other via an elastic member such as a sponge or a rubbery material.

The apparatus comprises a platen allowing an image to be read from a document conveyed by document conveying means for conveying the document, and a scoop-up member installed at a downstream of and next to the platen to scoop up a document sheet conveyed by the document conveying means. The scoop-up member comprises an opposite surface facing a side end surface of the platen with a gap, a platen joint portion abutting a bottom surface of the platen, and a dust collecting space in which dust entering through a gap between the side end surface of the platen and the opposite surface is collected. The dust collecting space includes a plate-like member guiding the dust, entering through the gap between the side end surface of the platen and the opposite surface, in a direction away from a joint surface between the bottom surface of the platen and the platen joint portion. (the bottom joint surface) The plate-like member includes a first end fixed to the platen so as to project from the platen side toward the scoop-up member side.

According to the present invention, the dust collecting space in which paper dust is collected is provided in the guide member scooping up the document from the platen, and includes the plate-like member dividing the dust collecting space into the upper dust collecting space and the lower dust collecting space. The present invention thus serves to prevent the dust from entering the apparatus through the gap between the platen and the guide member to the entry pathway (inlet) of the interior of the apparatus which is located at the bottom of the platen. Therefore, the present invention exerts the following effects.

The plate-like member is located so as to project from the platen into the collecting space. Thus, upon falling from the upper dust collecting space to the lower dust collecting space and being then collected in the lower dust collecting space, the dust is guided so as to leave away from the bottom joint surface. The dust is therefore prevented from easily entering the interior of the apparatus.

The dust collecting space is divided into the two portions, the upper dust collecting space and the lower dust collecting space, so that dust entering the upper dust collecting space is collected in the lower dust collecting space via the plate-like member. Thus, even if strong, shocking vibration or wind pressure acts on the platen, the effect thereof is mostly suppressed at the upper dust collecting space, so that the lower dust collecting space is exposed to reduced effect thereof. Thus, even if a gap is created in the bottom joint surface (shield portion) between the lower dust collecting space and the bottom surface of the platen, the dust is prevented from entering the interior of the apparatus through the gap.

Thus, according to the present invention, the dust collecting space is divided into the two portions, the upper dust collecting space and the lower dust collecting space so that the effect of vibration and wind pressure on the platen is blocked by the upper dust collecting space. The bottom joint surface (shield surface) between the bottom surface of the platen and the scoop-up member is located in the lower dust collecting space. Consequently, even with strong vibration acting repeatedly on the platen, the dust is prevented from entering the interior of the apparatus through the shield portion.

Moreover, by fixing the plate-like member to an edge of the bottom surface of the platen with an adhesive tape, the dust in the upper dust collecting space can be prevented from directly entering the interior of the apparatus. In this case, the exhausted platen can be easily disposed of and recycled by separating the platen from the plate-like member.

Furthermore, when the area between the lower dust collecting space and the bottom surface of the platen is shielded with an elastic member such as a sponge or rubber, the dust is collected, by the plate-like member, at a position located away from the shield portion. Thus, even if the shield member is thermally changed or degraded over time, the dust is prevented from entering the interior of the apparatus. The present invention enables to obtain the significant effects using the simple structure as described above.

BRIEF DESCRIPTION OF THE DRAWINGS

FIGS. 5A, 5B are diagrams illustrating an essential part of the configuration of the scoop-up guide member, wherein

DETAILED DESCRIPTION OF PREFERRED EMBODIMENT

Figure 1:
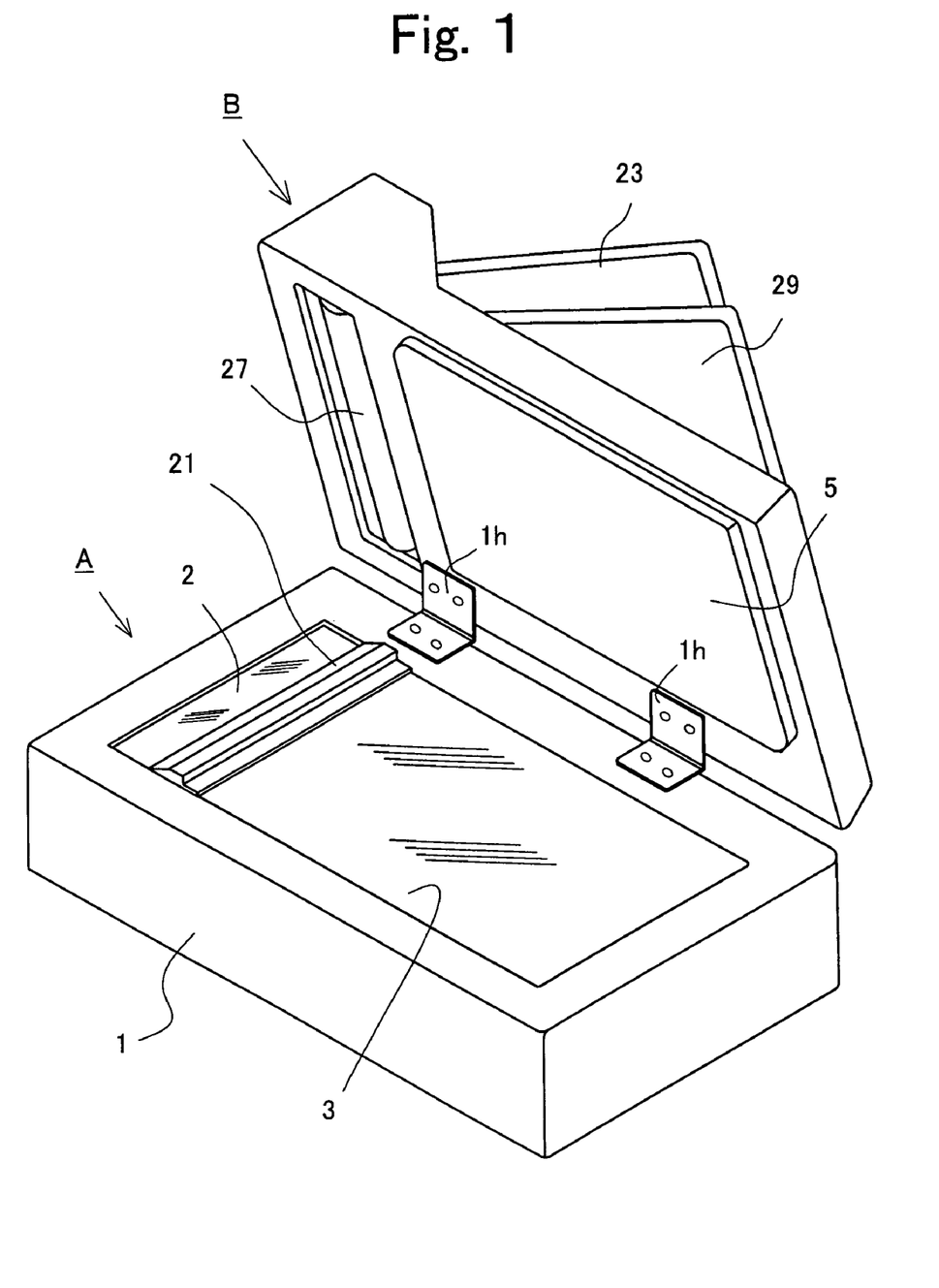
FIG. 1 is a perspective view showing a general configuration of an image reading apparatus according to the present invention.
Figure 2:
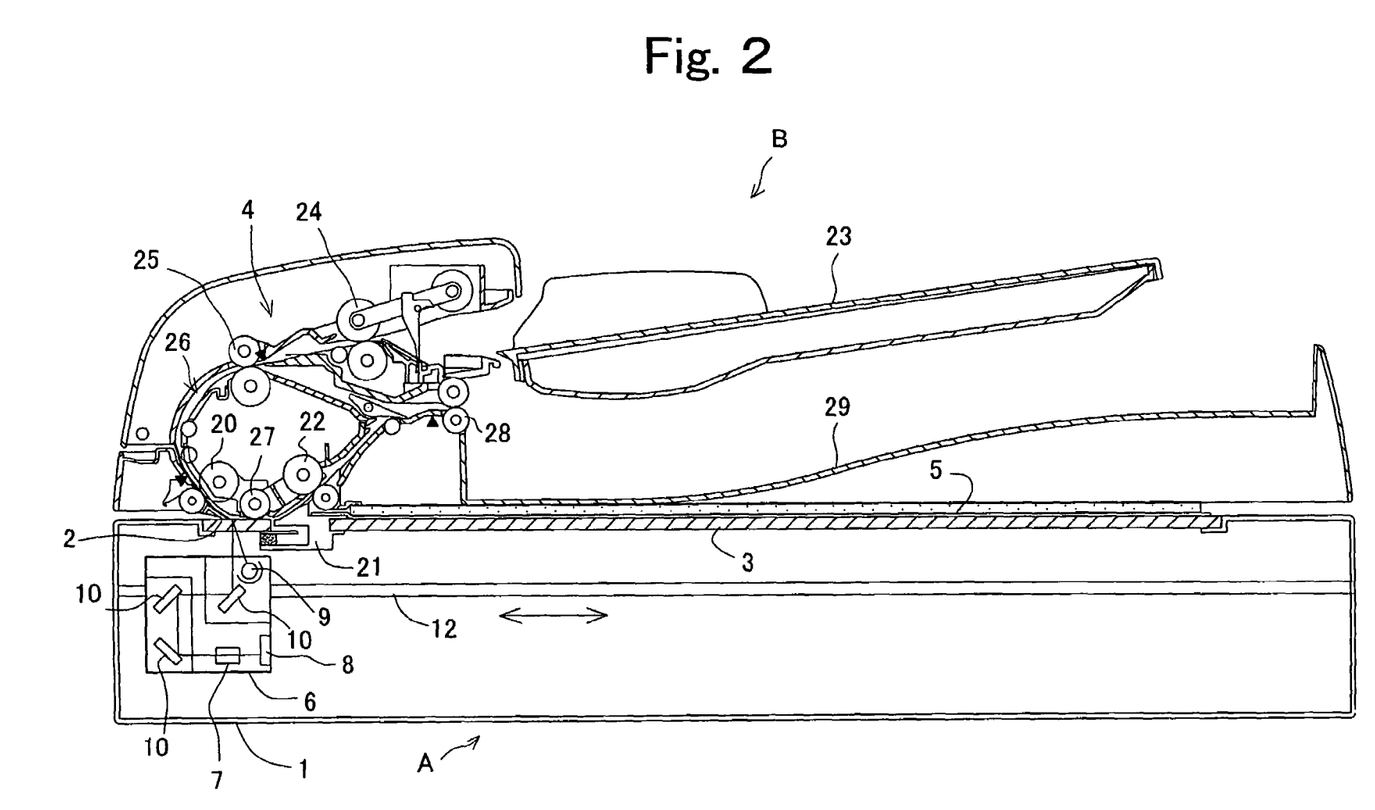
FIG. 2 is a vertically sectional view of the apparatus in FIG. 1.
Figure 3:
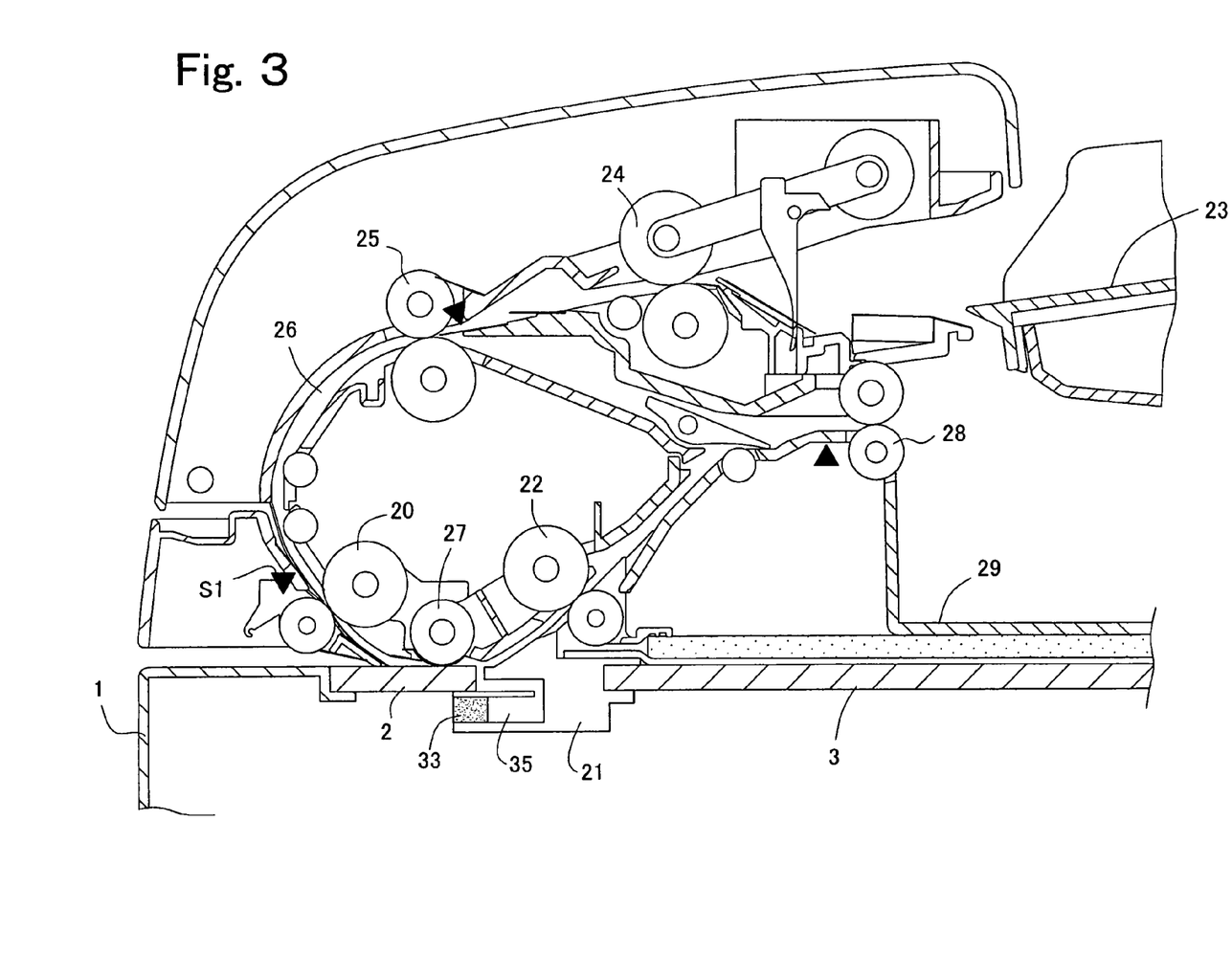
FIG. 3 is a sectional view illustrating an essential part of the apparatus which is required to feed a document to a platen.
Figure 4:
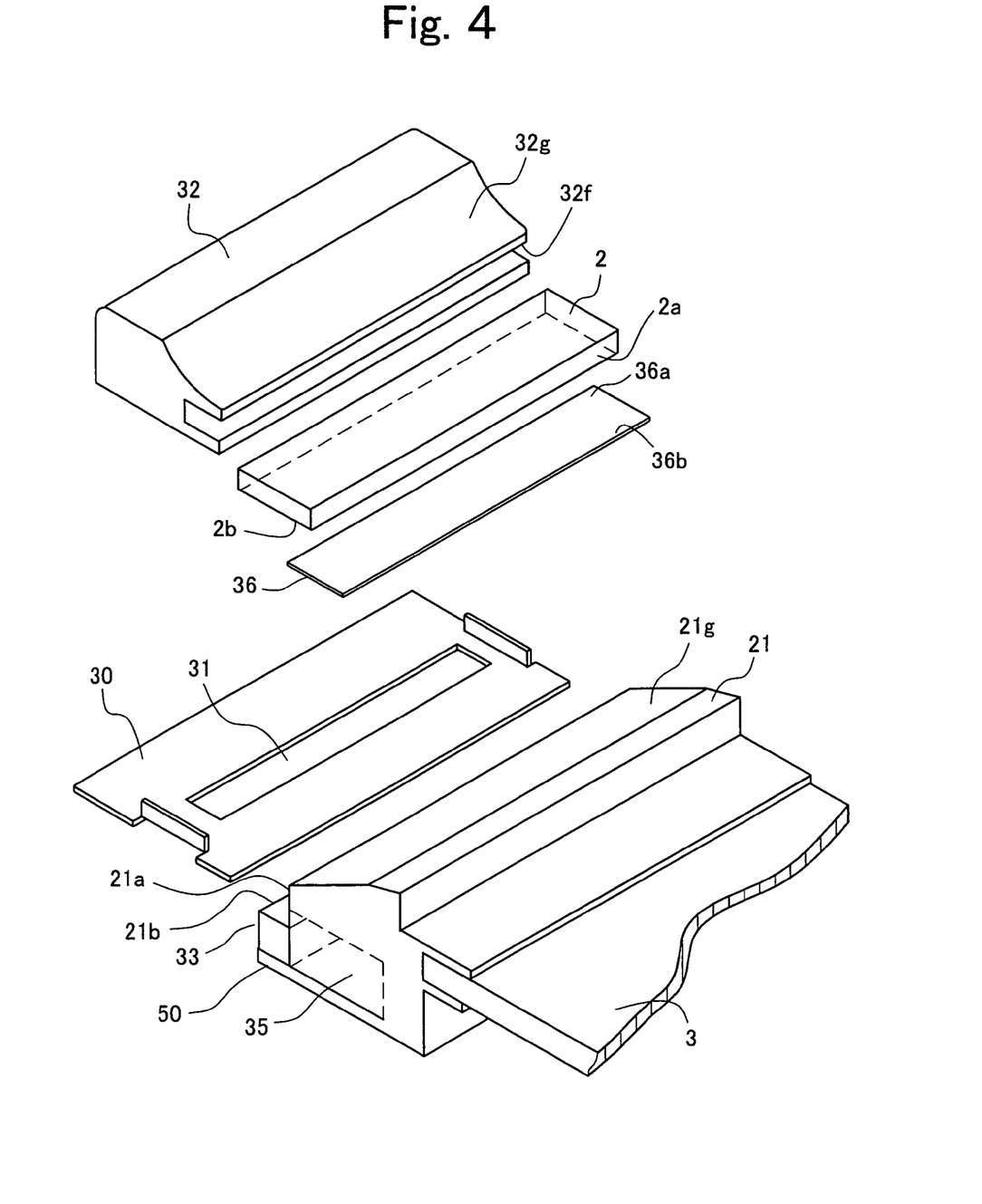
FIG. 4 is an exploded perspective view illustrating how the platen and a scoop-up guide member are assembled.
Figure 5A:
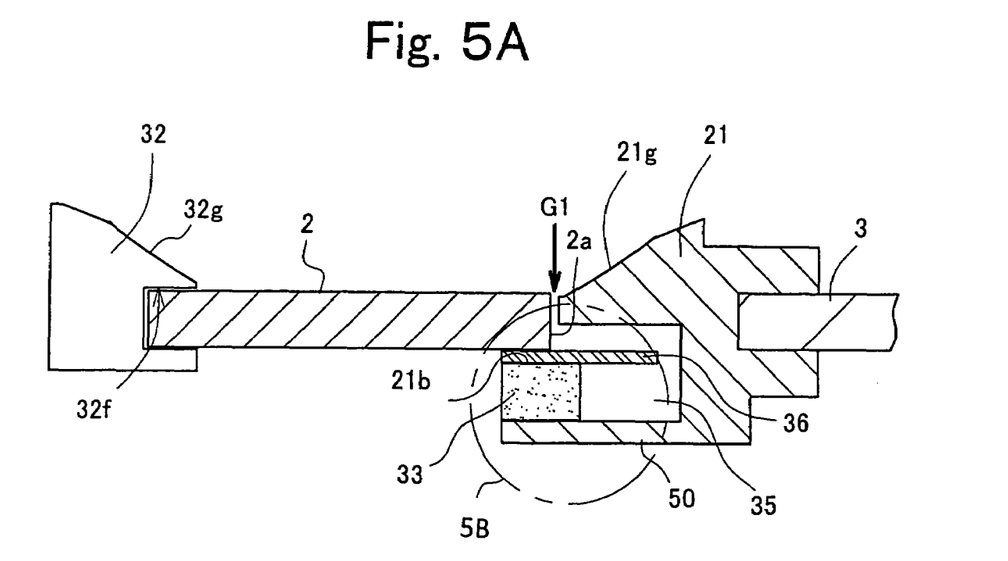
FIG. 5A is a diagram illustrating a general configuration of the scoop-up guide member.
Figure 5B:
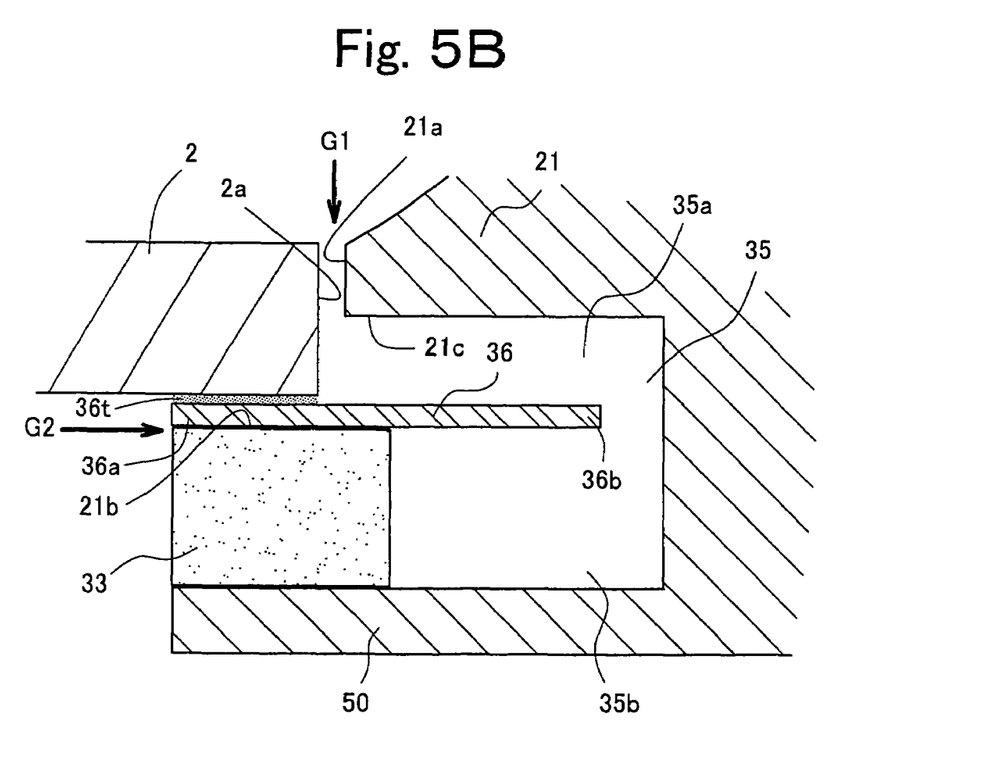
FIG. 5B is a diagram illustrating a portion 5B shown in FIG. 5A.

The present invention will be described below in detail on the basis of an illustrated preferred embodiment. FIG. 1 is a perspective view showing a general configuration of an image reading apparatus according to the present invention. FIG. 2 is a vertically sectional view of the image reading apparatus. FIG. 3 is a sectional view illustrating an essential part of the apparatus which is required to feed a document sheet to a platen. FIG. 4 is an exploded perspective view illustrating how the platen and a guide member are assembled. FIGS. 5A, 5B are diagrams illustrating an essential part of the configuration of the scoop-up guide member.

The image reading apparatus according to the present invention is composed of a scanner unit A and a document conveying unit B. The document conveying unit B is installed above the scanner unit A. As shown in FIG. 1, a document traveling platen 2 (hereinafter referred to as a "first platen 2") and a document fixing platen (hereinafter referred to as a "second platen") 3 are arranged in juxtaposition on a top surface of an outer casing (housing) 1; the document traveling platen 2 is composed of a transparent member such as glass to allow an image to be read from a sheet-like document conveyed by the document conveying unit B, and the document fixing platen 3 is composed of the transparent member similarly to the first platen to allow an image to be read from a stationary document. A scoop-up member (scoop-up guide member) 21 is located between the first platen 2 and the second platen 3 to scoop up the document. The document conveying unit B includes conveying means 4 (see FIG. 2) for conveying the document to the first platen 2, and a platen cover 5 that covers the document on the second platen 3. The document conveying unit B is coupled to the scanner unit A via hinges so as to be openable and closable, as shown in FIG. 1. The arrangements will be described below in detail.

[Configuration of the Scanner Unit]

As shown in FIG. 2, the scanner unit A includes the first platen 2 and second platen 3, described above, in the outer casing 1. The casing contains an image reading mechanism. The outer casing 1 accommodates a carriage 6 that reciprocates along the first and second platens 2 and 3. A light source lamp 9, a plurality of mirrors 10, a focusing lens 7, and a photoelectric conversion element 8 are arranged in the carriage 6. The carriage 6 is supported on a guide rail 12 and configured to reciprocate along the second platen 3. A document is irradiated with light from the light source lamp 9. Reflected light from the document is guided to the focusing lens 7 by the plurality of mirrors 10 and then electrically read by the photoelectric conversion element 8. To read an image from a document remaining stationary on the second platen 3, the carriage 6 is controlled to scan the document while moving along the second platen 3 to read the image using the photoelectric conversion element (line sensor) 8. To read an image from a document moving on the first platen, the carriage 6 is controlled to move to immediately below the first platen 2, where the carriage 6 comes to rest, and subsequently to read the image from the document moving on the first platen 2 at a predetermined speed.

The illustrated reading optical system is a reducing optical system but may of course be composed of a same-magnification optical system. In this case, an adhesion sensor may be used.

[Configuration of the Document Conveying Unit]

As shown in FIG. 2, the document conveying unit B is located over the first and second platens 2 and 3 so as to cover the first and second platens 2 and 3. The document conveying unit B includes a sheet feeding stacker 23 on which document sheets are stacked and housed, conveying means 4 for conveying each of the documents on the sheet feeding stacker 23 to the first platen, and a sheet discharging stacker 29 in which documents from which images have been read on the first platen 2 are collected.

The conveying means 4 includes a sheet feeding roller 24 that separately feeds the documents stacked on the sheet feeding stacker one by one, a registration roller pair 25 that corrects a skew of the separately fed document and then conveys the resulting sheet, a first conveying roller pair 20 that conveys the document further downstream, a second conveying roller 27, a third conveying roller 22, and a sheet discharging roller pair 28 located at a downstream of the third conveying roller pair 22 to discharge the document to the sheet discharging stacker 29. These rollers (roller pairs) are arranged along a conveying path 26 along which the document is guided from the sheet feeding stacker 23 to the sheet discharging stacker 29. Reference numeral S1 in the figures denote a lead sensor that senses a leading end of the document having reached the first platen 2.

As shown in FIG. 2, the sheet discharging stacker 29 is located below and in parallel with the sheet feeding stacker 23. The platen cover 5, which pressingly supports the document sheet on the second platen 3, is provided at the bottom of the sheet discharging stacker 29.

The document conveying unit B configured as described above is mounted to the upper housing (outer casing) 1 of the scanner unit A so as to be openable and closable via hinge members 1h (see FIG. 1).

[Configuration of the Scoop-Up Guide Mechanism]

Thus, in present invention, the first platen 2 and the scoop-up guide member 21 are configured as follows. As shown in FIG. 4, the first platen 2 is composed of a glass plate and fixed to a platen support member 30 located in the outer casing 1 of the scanner unit A. The platen support member 30 may be formed integrally with the outer casing 1. However, the illustrated platen support member 30 is formed of a metal support frame different from the outer casing 1. An exposure opening 31 is formed in the platen support member 30. The first platen 2 is fixed so as to cover the opening.

Thus, the first platen 2 is integrally fixed to the outer casing 1 via the plate support member 30. A carry-in guide member 32 is located adjacent to the first platen 2 on a document carry-in side (a left end side in FIG. 4) thereof. The scoop-up guide member 21 is located adjacent to the first platen 2 on a document carry-out side (a right end side in FIG. 4) thereof. The carry-in guide member 32 includes a guide surface 32g along which the document fed from the first conveying roller pair 20 is guided onto the first platen 2. The scoop-up member 21 includes a guide surface 21g to allow the document to be scooped up from the first platen 2. In addition to the guide surface 32g along which the document sheet is guided to the first platen 2, the carry-in guide member 32 includes a flange portion 32f fittingly supports an edge of a top surface of the platen.

On the other hand, the scoop-up guide member 21 contacts a side end surface 2a of the first platen 2. However, a small gap through which very small dirt such as paper dust can pass is present between the side joint surface (the opposite surface) 21a of the scoop-up guide member 21 and the side end surface 2a of the first platen 2. The reason is as follows. The first platen 2 is supported by the platen support member 30 and fixed to a predetermined position in contact with the scoop-up guide member 21. However, the scoop-up guide member 21 side and the first platen need to be separated from each other in order to open the interior of the apparatus for maintenance of the scanner unit A or the like. Thus, since the side end surface 2a of the first platen 2 and the side joint surface 21a of the scoop-up guide member 21 are not bonded together with an adhesive or the like, the small gap through which paper dust can pass is created between the side end surface 2a and the side joint surface 21a. The small gap forms an entry pathway (G1). In the description of the present embodiment, the scoop-up guide member 21 and the first platen 2 contact each other. However, the present embodiment embraces the case in which the scoop-up guide member 21 and the first platen 2 do not contact each other, for example, in association with positioning, that is, the present embodiment embraces all the cases in which the paper dust entry pathway is formed. Moreover, the scoop-up guide member 21 includes a dust collecting space (dust collecting pocket) 35, and a bottom portion 50. A shield member 33 (platen joint portion) made of an elastic member such as a sponge is fixed to a top surface of a distal end of the bottom portion 50. The shield member 33 is positioned below the first platen and forms the dust collecting space 35 as a first platen-side sidewall.

As shown in FIGS. 5A and 5B, a plate-like member 36 is bonded to a bottom surface of a side end of the scoop-up member 21 of the first platen 2. A bottom surface of the plate-like member 36 and a top surface (bottom joint surface 21b) of the shield member 33 contact each other. Thus, the shield member 33 and the first platen 2 contact each other via the plate-like member 36. The bottom surface of the plate-like member 36 and the top surface (bottom joint surface 21b) of the shield member 33 contact each other but are not fixedly bonded together with an adhesive or the like. This is because the scoop-up guide member (shield member 33) and the first platen 2 (plate-like member 36) need to be separated from each other in order to open the interior of the scanner device for maintenance or the like as described above.

Thus, since the bottom surface of the plate-like member 36 and the top surface of the shield member 33 contact each other but are not fixedly bonded together with an adhesive or the like, a small gap G2 is formed through which very small substances such as paper dust can pass. The gap G2 serves as an entry pathway along which the dust such as paper dust enters the interior of the scanner.

As shown in FIG. 5B, the dust collecting pocket 35 is divided into two dust collecting chambers, an upper dust collecting chamber 35a and a lower dust collecting chamber 35b, by the plate-like member 36. Thus, the plate-like member 36 is formed of an elastic plate (sheet), for example, a polyethylene film. The plate-like member 36 has a first end 36a bonded to an edge 2b of the bottom surface of the first platen 2 with an adhesive material (adhesive tape) 36t. Thus, even when an impact acts between the plate-like member 36 and the first platen 2, no gap through which dust can pass is formed. Furthermore, when the first platen 2 is worn and replaced with a new one, the plate-like member 36 can be easily separated from the first platen 2 to allow the first platen 2 to be disposed of or recycled.

A distal end 36b of the plate-like member 36 is located so as to project into the dust collecting pocket 35. Thus, a gap is formed between the distal end 36b and an inner wall of the dust collecting pocket 35. Consequently, the upper dust collecting chamber 35a is connected to the lower dust collecting chamber 35b.

Thus, dust entering the apparatus through the gap G1 formed between the side end surface 2a of the first platen 2 and the side joint surface 21a of the scoop-up member 21 falls on the plate-like member 36 and is thus collected in the upper dust collecting chamber 35a. On the plate-like member 36, the dust thereafter moves rightward in FIG. 5B, that is, moves away from the gap G2, and then falls into the lower dust collecting chamber 35b, where the dust is collected.

In this manner, the plate-like member 36 extends so as to allow the dust to bypass the entry pathway from the gap G1 to the gap G2. The dust is thus prevented from entering the interior of the scanner. Moreover, although the dust entering the apparatus through the gap G1 falls down and is collected in the lower dust collecting chamber 35b, since the gap G2, which otherwise forms the entry pathway, is filled with the seal member 33 so as to be present only at a high position, the dust is further prevented from entering the interior of the scanner.

Figure 6:
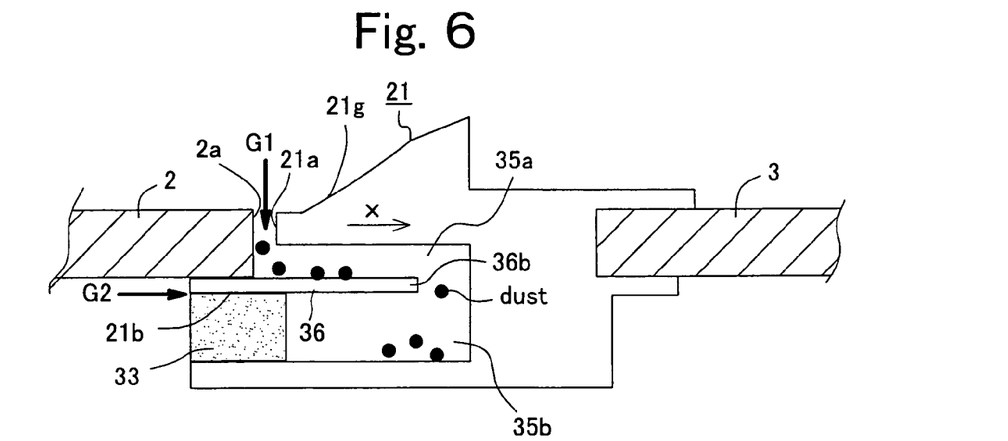
FIG. 6 is a diagram of an operational state of the scoop-up guide member, illustrating the operation of the scoop-up guide member.

The operation of the scoop-up guide member 21 configured as described above will be described below with reference to FIG. 6 showing an operational state.

The dust entering the apparatus through the gap G1 falls into the upper dust collecting chamber 35a and then moves away (in the direction of arrow X) from the gap G2 along the plate-like member 36. The dust is thus collected in the lower dust collecting chamber 35b.

In this manner, the plate-like member 36 allows the dust to bypass the entry pathway of the dust from the gap G1 to the gap G2, leading to the interior of the scanner. The dust entering the apparatus through the gap G1 is prevented from reaching the gap G2. Moreover, since the gap G2 is formed at a higher position by the shield member, the dust collected in the lower dust collecting chamber 35b is unlikely to reach the gap G2. The dust is thus further prevented from entering the interior of the scanner.

An opening or closing operation of the document conveying unit B or a certain load imposed from above may bend the scoop-up guide member 21 and the first platen 2.

Figure 7A:
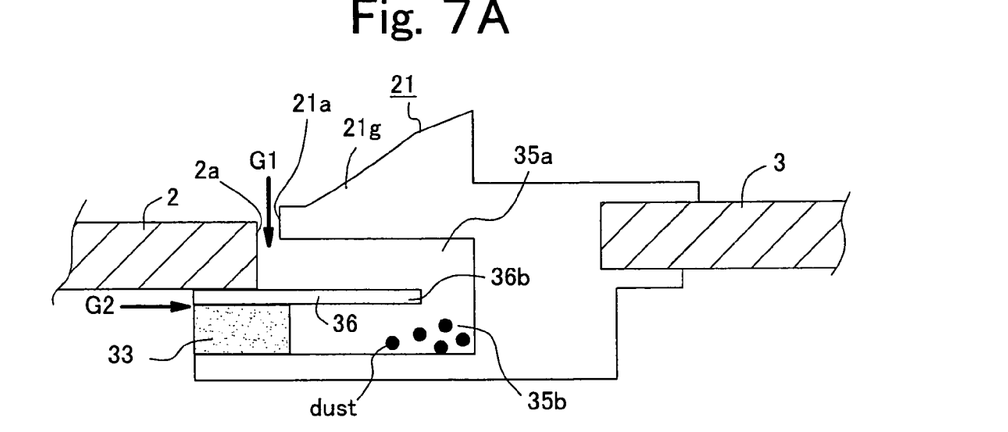
FIG. 7A is a diagram showing a dust collecting state in which a first platen is bent.

For example, as shown in FIG. 7A, if the first platen 2 is bent downward, the shield member is simply compressed, with the gap G2 between the shield member 33 and the plate-like member 36 prevented from being significantly enlarged. Thus, as is the case with FIG. 6, the dust can be prevented from entering the interior of the scanner.

Figure 7B:
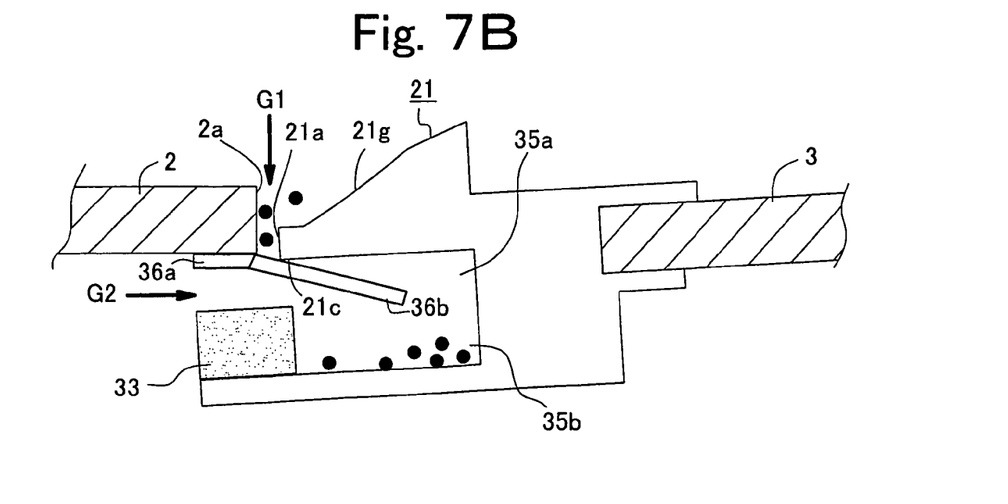
FIG. 7B is a diagram showing a dust collecting state in which the scoop-up guide member is bent.

If the scoop-up guide member 21 is bent, then as shown in FIG. 7B, the scoop-up guide member 21 lowers to push down the plate-like member 36, enlarging the gap G2. However, the shield member 33 serves as a wall to prevent the dust collected in the lower dust collecting chamber 35b from entering the interior of the scanner. Thus, in spite of the enlarged second gap G2, the dust can be prevented from entering the interior of the scanner.

According to the present invention, as described above, even if the gap G1 is created between the platen side end surface 2a and the side joint surface 21a of the scoop-up guide member 21, the dust entering the apparatus through the gap G1 is collected in the upper dust collecting chamber 35a and the lower dust collecting chamber 35b. The dust is thus prevented from entering the interior of the scanner. In particular, the plate-like member 36 projecting from the first platen 2 side is provided between the upper and lower dust collecting chambers 35a and 35b. The operation of the plate-like member 36 reduces the likelihood that the dust moves from the bottom joint surface 21b into the scanner.

In the description of the present invention, the first and second platens 2 and 3 are arranged in parallel. However, the second platen 3, to which the document is fixed, does not necessarily need to be provided. The apparatus configuration includes only the first platen 2. Furthermore, in the description, the base end (first end) 36*a* of the plate-like member 36 is bonded to the first platen 2. However, instead of being bonded to the first platen 2, the plate-like member 36 may be fixed to another member and placed in abutment with the bottom surface of the platen. Additionally, instead of being bonded to the bottom surface of the plate, the plate-like member 36 may be bonded to another portion such as the platen side end surface 2*a*.

The disclosure of Japanese Patent Application No. 2007-254815, filed on Sep. 28, 2007, is incorporated in the application.

While the invention has been explained with reference to the specific embodiments of the invention, the explanation is illustrative and the invention is limited only by the appended claims.

What is claimed is:

1. An image reading apparatus, comprising:
   a housing;
   an image reading device for reading an image on a document being conveyed, the image reading device being located in the housing;
   a platen located in the housing and formed of a transparent member for reading the image of the document; and
   a scoop-up device situated parallel to the platen at a downstream side of the platen relative to a conveying direction of the document to scoop up the document, the scoop-up device comprising:
   a dust collecting space for collecting dust entering the apparatus through a gap between the platen and the scoop-up device,
   a platen joint portion defining a part of the dust collecting space and positioned below the platen, the platen joint portion having a top surface detachably contacting a bottom surface of the platen, and
   a plate member disposed in the dust collecting space for dividing the dust collecting space into an upper dust collecting space and a lower dust collecting space.

2. The image reading apparatus according to claim 1, wherein the plate member includes a first end fixed to the bottom surface of the platen and a second end projecting into the dust collecting space, and the platen joint portion and the bottom surface of the platen contact each other via the plate member.

3. The image reading apparatus according to claim 1, wherein the platen joint portion comprises an elastic member, the elastic member being a sponge or a rubbery material.

4. An image reading system, comprising:
   a scanner unit for reading the image of the document on the platen, the scanner unit having the image reading apparatus according to claim 1; and
   a document conveying unit for conveying the document to the platen, wherein the document conveying unit comprises:
   a sheet feeding stacker for placing the document thereon;
   conveying roller means for conveying the document from the sheet feeding stacker to the platen;
   sheet discharging roller means for discharging the document from the platen; and
   a sheet discharging stacker for accommodating the document discharged from the sheet discharging roller means.

5. An image reading apparatus, comprising:
   a platen for reading an image on a document conveyed by document conveying means for conveying the document, the platen having a side end surface and a bottom surface; and
   a scoop-up device situated parallel to the platen at a downstream of the platen relative to a conveying direction of the document to scoop up the document, wherein the scoop-up device comprises:
   an opposite surface facing the side end surface of the platen with a gap thereto;
   a platen joint portion detachably abutting the bottom surface of the platen;
   a dust collecting space for collecting dust entering through the gap between the side end surface and the opposite surface, and
   a plate member guiding the dust entering through the gap in a direction away from a contact surface between the bottom surface of the platen and the platen joint portion, the plate member having a first end fixed to the platen so as to project from the platen side toward a side of the scoop-up device.

6. The image reading apparatus according to claim 5, wherein the plate member is an elastically deformable sheet member.

7. The image reading apparatus according to claim 5, further comprising a second platen provided adjacent to the scoop-up device to read an image from a stationary document.

* * * * *